Dec. 22, 1953   G. J. STREZYNSKI   2,663,718
CLARIFICATION OF DISTILLERY SLOP AND THE LIKE
Filed April 20, 1950
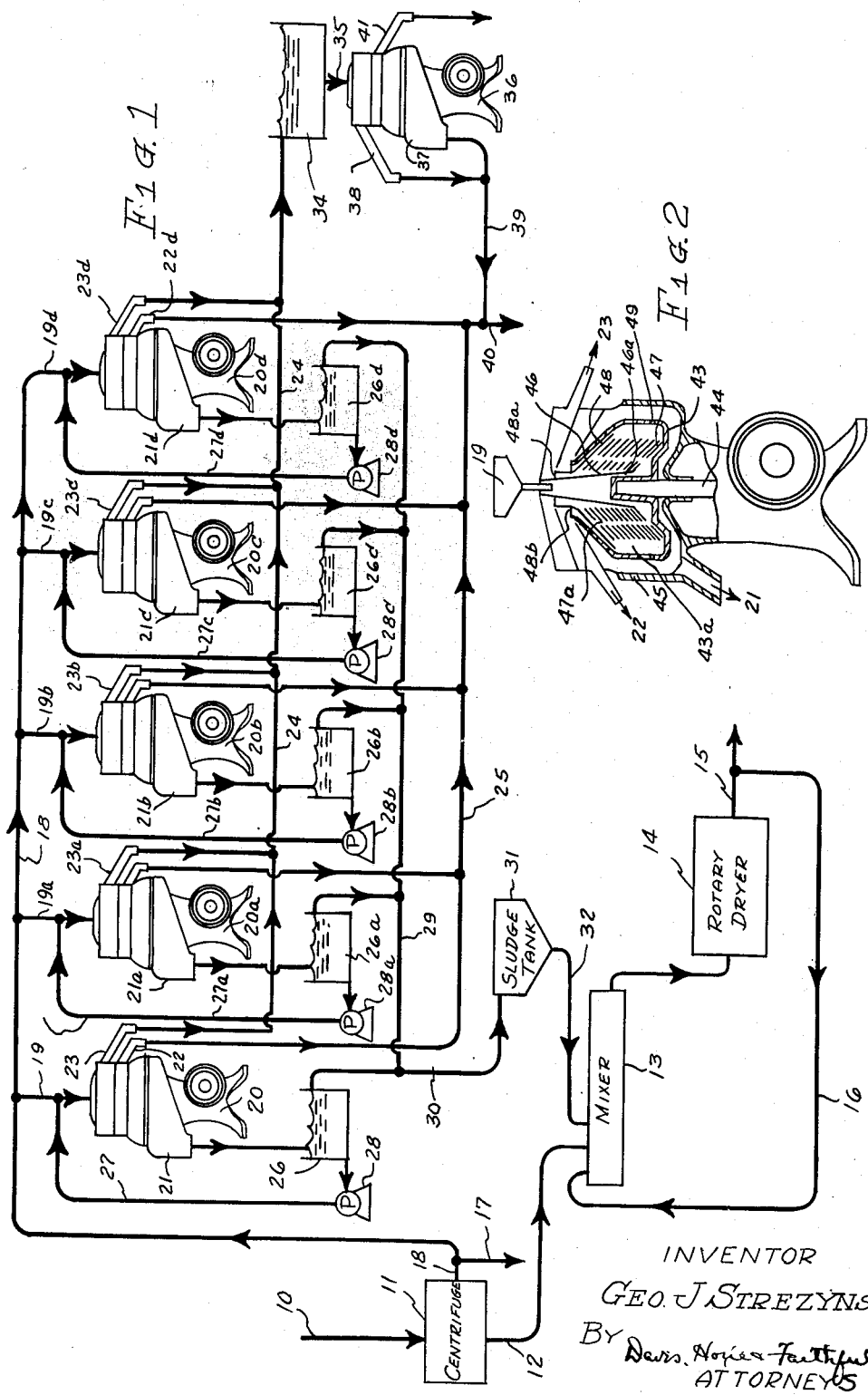
INVENTOR
GEO. J. STREZYNSKI
BY Davis, Hoxie Faithfull
ATTORNEYS Patented Dec. 22, 1953

2,663,718

UNITED STATES PATENT OFFICE 2,663,718

CLARIFICATION OF DISTILLERY SLOP AND THE LIKE

George J. Strezynski, Poughkeepsie, N. Y., assignor to The De Laval Separator Company, New York, N. Y., a corporation of New Jersey Application April 20, 1950, Serial No. 157,015

10 Claims. (Cl. 260—412.5)

This invention relates to the clarification of distillery slop and similar materials containing water, oil, and insolubles; and it has for its principal object the provision of an improved centrifugal process for removing insolubles and recovering oil from these materials.

Various centrifugal processes have been proposed for the clarification of distillery slop, and some of them have been used. However, in these prior processes, after screening the slop, it is generally necessary to pass the screenings to a dehydrator or press, such as a rotary press, to squeeze some of the liquid from them. Also, these processes usually require gravity settling of the thin slop from the screen and the press, before it is fed to the centrifuge for separation of the sludge. Accordingly, a considerable amount of equipment is required to prepare the material for the centrifugal separation. Moreover, most of the grain oil in the original material is not recovered in such processes.

I have found that most of the oil in the original slop is not in the liquid phase of the material but is occluded in the solids, which generally constitute about 5% (more or less) by weight of the material. In the normal operation of the centrifugal separators, the retention time of the solids in the bowl is very short, and the solids are delivered into the bowl at its peripheral portion, that is, near the outlets for the relatively heavy sludge. Therefore, most of the solids drop out of the liquid as soon as they enter the bowl, so that the treatment is insufficient to recover much of the oil, even when the screenings are fed to a press prior to the centrifuging.

According to the present invention, a stream of the slop, after being heated, is first subjected to a preliminary coarse separating operation to remove some of the coarse solids, preferably by centrifugal action, as in the Bird type of continuous centrifuge. By this preliminary centrifuging, the coarse separation is effected simultaneously with a thorough squeezing of the solids and an expulsion of some of the oil from them. The solids thus removed from the slop are continuously discharged from the preliminary separating operation as sludge, while the remainder of the slop is discharged as an effluent in which the lighter solids are suspended. This effluent discharge is divided into separate streams each of which is fed to a separate centrifugal chamber where it is separated into three components, namely, an oil emulsion as the lightest component, an effluent as an intermediate component, and sludge as the heaviest component, the latter accumulating in the outer zone of the separating chamber. These three components are separately discharged from the chambers, and part of the discharged sludge component is recirculated to the separating chambers but at regions spaced inwardly from their outer zones. In this way, the retention time of the solids in the bowl is increased, and the solids are subjected to repeated squeezing and washing. Thus, while only the coarse particles are effectively squeezed in the coarse separation, the lighter and smaller particles in the effluent from this preliminary centrifuging are effectively squeezed in the subsequent centrifugings. The amount of recirculation is controlled to provide the equivalent of approximately eight consecutive passes of the solids through the chamber, for best results, although the recirculation rate may be controlled to provide the equivalent of only three consecutive passes. The recirculated solids or sludge may be introduced into the centrifugal chamber together with or separately from the main feed to the chamber. The sludge which is not recirculated to the centrifugal chambers may be combined with the sludge discharged from the preliminary separation and then dehydrated for use as feed, etc.

The oil emulsion or lightest component discharged from the centrifugal chambers will at least in part be in the form of, or occluded by, small germ particles saturated with oil. To obtain a maximum yield of pure oil, the discharged oil component (or at least that part of it carrying the germ particles) should be chemically treated, as by solvent extraction, acid reduction or both, and then subjected to another stage of centrifugal clarification.

With the new process, it is possible to recover as much as 60% of the oil contained in the original material. Moreover, the amount of necessary equipment is considerably reduced, because the process does not depend upon the presses or dehydrators and the settling tanks used heretofore to prepare the material for centrifuging.

For a better understanding of the invention, reference may be had to the accompanying drawings, in which Fig. 1 is a schematic view of an installation for practicing the process, and Fig. 2 is a vertical sectional view of a centrifugal bowl forming one of the three-way separating chambers of the installation.

For illustrative purposes, the invention will be described specifically in connection with the treatment of the bottoms from beer stills, although it will be understood that the invention is applicable to the treatment of other materials of similar nature as well.

Referring to Fig. 1, it will be assumed that the bottoms from the beer still are to be treated at the rate of 12,035 G. P. H. and that the bottoms contain, by weight, 4.8% solids (of which 30–35% are proteins), .6% oil and 94.6% water. The bottoms, after being heated to a temperature of about 180° F., are fed through the coarse separator or centrifuge 11, which is preferably a 36″ Bird continuous centrifuge. In the latter, the solids are thoroughly compacted and squeezed under the action of centrifugal force and at the same time the coarser solids are separated from the bottoms and discharged separately as sludge into a pipe line 12. The sludge discharge into pipe 12 is at the rate of 250 G. P. H., and the sludge contains about 23% solids (of which about 22% are proteins), 1.3% oil and 75.7% water. The pipe 12 leads to a mixer 13, where the sludge is mixed with other material as will be described presently. From the mixer 13, the sludge passes to a rotary dryer 14 and is finally discharged therefrom, in the form of dry meal, into pipe 15. The dry meal is discharged into pipe 15 at a rate of about 1,576 lbs./hr., and it contains about 5.7% oil, 3% water and 91.3% solids (of which 32–34% are proteins). Approximately 10–30% of the total discharge from the dryer 14 is recycled to the mixer 13 through a return line 16.

The material from which the coarser solids are thus removed in the preliminary centrifuge 11 is discharged continuously as an effluent containing the squeezed solids, into a pipe line 18. This effluent is discharged at a rate of 11,785 G. P. H. and contains about 4.4% solids (of which 32–36% are proteins), .6% oil and 95% water. Of the effluent discharge into pipe 18, approximately 3,785 G. P. H. are withdrawn through pipe 17 and returned to the mash tubs. The remainder of the effluent or slop (about 8,000 G. P. H.) is divided into a plurality of separate streams leading from the pipe 18. As illustrated, the effluent discharge from the preliminary centrifuge is divided into five separate streams 19, 19a, 19b, 19c and 19d. These separate effluent streams, after reheating, if necessary, are fed, respectively, to centrifuges 20, 20a, 20b, 20c and 20d which are of the type adapted to effect a three-way separation of the material into an oil emulsion as the lightest component, an effluent as an intermediate component, and sludge as the heaviest component. Preferably, the centrifuges 20—20d are of the DeLaval AC-VO type having an outlet 21 for the sludge, an outlet 22 for the effluent and an outlet 23 for the oil emulsion.

The oil emulsion discharges from the outlets 23—23d of the several centrifuges are combined in a pipe line 24 and subjected to further processing, as will be described presently. The effluent discharges from the outlets 22—22d are combined in another pipe line 25.

The sludge discharges from the outlets 21—21d are delivered, respectively, to receptacles or decanters 26, 26a, 26b, 26c and 26d. From the bottom of each receptacle 26, a part of the sludge is returned to the corresponding centrifuge 21 through a recirculation line 27 by means of a pump 28. It is important that this recirculated sludge be fed directly into the separating zone of the centrifugal bowl, that is, to a region spaced a substantial distance inwardly toward the rotation axis from the outer zone of the bowl where the separated sludge accumulates before it is discharged through outlet 21. Preferably, each bowl contains a stack of conical discs (Fig. 2) in the separating zone, and the recirculated sludge is fed directly into a region located about midway between the inner and outer diameters of the discs, where they are provided with distributing holes. Such feeding of the recirculated sludge may be effected by connecting each recirculation pipe 27 to the inlet pipe 19 of the corresponding centrifuge and arranging the bowl so that the combined original feed and recirculated sludge received from pipe 19 are delivered into the separating zone at the prescribed location. Alternatively, the recirculated sludge may be fed into the separating zone separately from the original feed, as by delivering the sludge through a hollow spindle of the bowl and through radial tubes leading from the spindle to the distributing holes in the conical discs or to a separate set of disc distributing holes staggered radially with respect to the normal holes for distributing the original feed and centered at a slightly larger diameter than the normal distributing holes.

The rate at which the sludge is recirculated is also important in the practice of the process. Preferably, the sludge recirculation rate is sufficient to provide the equivalent of eight consecutive passes of the sludge through the bowl chamber, although a rate providing the equivalent of from 3–12 consecutive passes is satisfactory. In the example which I have described for illustrative purposes, the feed to the five secondary centrifuges 20—20d is at the rate of 8,000 G. P. H., so that the rate of feed of original material to each of these centrifuges is 1,600 G. P. H. The oil emulsion is discharged from each outlet 23 at a rate of 50 G. P. H.; the effluent or intermediate component is discharged through each outlet 22 at a rate of 1,470 G. P. H.; and the sludge is discharged through each outlet 21 at a rate of 1,080 G. P. H. Of the latter component, 80 G. P. H. are withdrawn from the top of each receptacle 26 through converging pipe lines 29 and 30. The remainder of the sludge in each receptacle 26, amounting to 1.000 G. P. H., is recirculated to the corresponding centrifuge through pipe 27, so that the total feed to each centrifuge 20 is at the rate of 2,600 G. P. H.

By reason of this repeated recirculation of sludge to the separating zones of the several parallel-operating centrifuges 20—20d, the total retention period of the sludge in the centrifugal bowls is greatly increased. The action is cumulative in effect, because the solids in passing from the separating zone to the outlet 21 are squeezed centrifugally to expel or "loosen" the occluded oil and at the same time, or in a subsequent pass of the solids through the bowl, the released oil is separated from the solids and displaced inwardly for discharge through the outlet 23.

The sludge entering the pipe 30 from the sludge receptacles 26—26d (amounting to about 400 G. P. H.) is delivered to a sludge tank 31, where it is allowed to settle. From the bottom of tank 31, the sludge is fed to the mixer 13 and there combined with the sludge discharge from the preliminary centrifuge 11 and with the recycled meal from dryer 14. The sludge delivered to the mixer by pipe 32 contains about 13.5% solids (of which about 45% are proteins), .8% oil and 85.7% water.

The combined oil emulsion from pipe 24 is delivered at a rate of 250 G. P. H. to a tank 34, where it is subjected to chemical treatment to extract oil from germ particles in which it may be occluded. The chemical treatment in tank 34 may be solvent extraction, acid reduction, or both. The mixture is then fed through pipe 35 into another centrifuge 36 to remove the impurities from the oil. As shown, the centrifuge 36 is of the same type as the centrifuges 20—20d. The impurities separated from the oil in the centrifuge 36 are discharged through outlets 37 and 38 and delivered by pipe 39 at a rate of 222 G. P. H. to a pipe 40 where it joins the effluent from the outlets 22—22d. The effluent discharge through pipe 40 contains about 3.1% solids (of which 30–35% are proteins), .2% oil and 96.7% water, and it is at the rate of about 7,572 G. P. H.

The clarified oil is discharged from centrifuge 36 through an outlet 41 at a rate of 28 G. P. H., and it represents a recovery of approximately 52.2% of oil from the slop.

Referring to Fig. 2, the three-way separator there shown is of a type which may be used for the separators 20—20d and 36 in Fig. 1. It comprises a centrifugal bowl 43 supported and driven by a spindle 44 in the stationary frame or housing 45. The feed material, that is, the material passing through one of the feed pipes 19—19d or pipe 35, is delivered into a central tubular shaft 46 in the bowl, from which it passes through openings 46a into the distribution holes 47a in a stack of spaced conical separating discs 47 in the separating chamber of the bowl. The discs 47 are located in an intermediate zone of the separating chamber, and it is to this zone that the recirculated sludge is fed, in this case with the original feed passing through the tubular shaft 46. The oil emulsion or lightest component separated between the discs 47 is displaced inwardly and discharged through an outlet 48a between the tubular shaft and a top disc 48, the emulsion then passing through the outlet 23 of the stationary structure. The effluent and sludge separated between the discs move outwardly in the separating chamber. The effluent or intermediate component discharges from the outer part of the chamber through passages located between the top disc 48 and the bowl top, these passages leading inwardly and upwardly to an intermediate outlet 48b. From the latter, the effluent is discharged through the outlet 22 of the stationary structure. The sludge, being the heaviest component, moves to the outer zone 43a of the separating chamber where an annulus of the sludge is accumulated, and sludge is continuously discharged from this annulus through openings or nozzles 49 in the bowl periphery. The sludge is finally discharged from the stationary structure of the separator through outlets 21.

I claim:

1. In the clarification of distillery slop, and the like, containing water, oil and solids, the process which comprises heating the slop, subjecting a stream of the heated slop to a preliminary, coarse separating operation, to remove some of the coarse solids, squeezing said coarse solids to express some of the oil therefrom, continuously discharging said removed solids from the preliminary separating operation as sludge and separately discharging the remainder of the slop as an effluent containing relatively fine solids, dividing said effluent discharge into a plurality of separate similar streams, feeding each of said last streams to a separate centrifugal separating chamber and there separating it into three components, namely, an oil emulsion as the lightest component, an effluent as an intermediate component, and sludge as the heaviest component, accumulating an annulus of said sludge component in an outer zone of each chamber, separately discharging said components from the chambers, and continuously recirculating part of the sludge components discharged from said chambers to the separating chambers at regions located inwardly from their outer zones.

2. A process according to claim 1, comprising also the steps of combining the remainder of the discharged sludge component with said sludge discharge from the preliminary separating operation, and dehydrating the combined sludge.

3. A process according to claim 1, in which said part of the discharged sludge component is recirculated to the separating chambers by mixing the same with said separate streams before they enter the chambers.

4. A process according to claim 1, in which the recirculated sludge component is fed into each separating chamber at an intermediate zone thereof.

5. A process according to claim 1, in which said separate streams and the recirculated sludge component are fed separately into intermediate zones of the separating chambers.

6. A process according to claim 1, comprising also the steps of combining the oil emulsion components discharged from the chambers and subjecting the same to an emulsion-breaking treatment, recentrifuging the treated oil to remove impurities therefrom, and combining said impurities with the effluent components from the separating chambers.

7. A process according to claim 1, in which said continuous recirculation of discharged sludge component is effected at a rate sufficient to provide the equivalent of at least three consecutive passes of the sludge through the chambers.

8. A process according to claim 1, in which said continuous recirculation of discharged sludge component is effected at a rate sufficient to provide the equivalent of approximately eight consecutive passes of the sludge through the chambers.

9. A process according to claim 1, comprising also the step of dividing said streams into thin conical layers in intermediate zones of the respective chambers, to facilitate separation into said three components, the recirculated part of the sludge component being fed into said intermediate zones.

10. A process according to claim 1, in which said preliminary separating operation is effected centrifugally and simultaneously with said squeezing.

GEORGE J. STREZYNSKI.

References Cited in the file of this patent

UNITED STATES PATENTS

| Number | Name | Date |
|---|---|---|
| 1,985,426 | Ragsdale | Dec. 25, 1934 |
| 2,372,677 | Lassen | Apr. 3, 1945 |
| 2,513,687 | Strezynski | July 4, 1950 |